(12) United States Patent
Sung et al.

(10) Patent No.: US 7,755,469 B2
(45) Date of Patent: Jul. 13, 2010

(54) RADIO FREQUENCY IDENTIFICATION TAG AND RADIO FREQUENCY IDENTIFICATION PRIVACY PROTECTION SYSTEM AND METHOD

(75) Inventors: Maeng-hee Sung, Seoul (KR); Dae-youb Kim, Seoul (KR); Hwan-joon Kim, Seoul (KR); Weon-il Jin, Suwon-si (KR)

(73) Assignee: Samsung Electronics, Co., Ltd., Suwon-si (JP)

( * ) Notice: Subject to any disclaimer, the term of this patent is extended or adjusted under 35 U.S.C. 154(b) by 978 days.

(21) Appl. No.: 11/398,710

(22) Filed: Apr. 6, 2006

(65) Prior Publication Data

US 2007/0069851 A1 Mar. 29, 2007

(30) Foreign Application Priority Data

Sep. 28, 2005 (KR) ........................ 10-2005-0090969

(51) Int. Cl.
*H04Q 5/22* (2006.01)
(52) U.S. Cl. .................... 340/10.1; 340/5.1; 340/572.1; 455/41.2; 455/411
(58) Field of Classification Search ......... 340/5.1–5.92, 340/10.1–10.6, 572.1–572.9; 380/46, 270, 380/42, 43, 277–286, 28–30, 44, 47; 713/189, 713/170; 235/375–385; 455/41.2, 411
See application file for complete search history.

(56) References Cited

U.S. PATENT DOCUMENTS

| 7,212,637 | B2 * | 5/2007 | Salisbury ..................... 380/270 |
| 7,492,258 | B1 * | 2/2009 | Shoarinejad et al. ...... 340/572.1 |
| 2003/0112972 | A1 * | 6/2003 | Hattick et al. ................. 380/46 |
| 2004/0222878 | A1 * | 11/2004 | Juels ......................... 340/10.1 |
| 2005/0017844 | A1 * | 1/2005 | Cole .......................... 340/10.1 |
| 2006/0044115 | A1 * | 3/2006 | Doi et al. ................. 340/10.42 |
| 2006/0077034 | A1 * | 4/2006 | Hillier ....................... 340/5.61 |

* cited by examiner

*Primary Examiner*—Rafael Pérez-Gutiérrez
*Assistant Examiner*—Neda Behrooz
(74) *Attorney, Agent, or Firm*—NSIP Law (57) ABSTRACT

A radio frequency identification (RFID) tag, an RFID privacy protection system, and an RFID privacy protection method are provided. The RFID privacy protection method includes a pseudo identification (ID) used to authenticate the RFID reader and a key used to generate the pseudo ID are received; if the pseudo ID is received in response to an information request signal for reading information of the RFID tag comprising the pseudo ID, the key is transmitted; and if a pseudo ID generated using the key is equal to the pseudo ID received in response to the information request signal, an RFID of the RFID tag to read the information of the RFID tag is received.

8 Claims, 8 Drawing Sheets

RADIO FREQUENCY IDENTIFICATION TAG AND RADIO FREQUENCY IDENTIFICATION PRIVACY PROTECTION SYSTEM AND METHOD

CROSS-REFERENCE TO RELATED APPLICATIONS

This application claims the benefit under 35 U.S.C. §119 (a) of Korean Patent Application No. 2005-90696, filed Sep. 28, 2005 in the Korean Intellectual Property Office, the entire disclosure of which is hereby incorporated by reference.

BACKGROUND OF THE INVENTION

1. Field of the Invention

The present invention relates to a radio frequency identification (RFID) tag and an RFID privacy protection system and method. More particularly, the present invention relates to an RFID tag and an RFID privacy protection system and method protecting information of a substantial RFID using a pseudo ID.

2. Description of the Related Art

RFID is an automatic identification and data capture (AIDC) technology for reading data stored in a tag with a microchip using a radio frequency (RF) in a non-contact way.

An RFID system includes a reader and a tag. When the reader requests tag data of the tag, the RFID system operates so that the tag transmits the tag data in RF form to the reader.

Various devices having RFID reader functions can transmit a tag data transmission request signal to a tag to read RFID tag data. As a result, a tag data protection problem occurs. For example, when a buyer purchases an article with a tag and RFID readers, except an RFID reader of the buyer, request a transmission of tag data, the tag data is transmitted to the RFID readers.

Accordingly, there is a need for an improved method and system for protecting tag data after a buyer purchases an article with a tag.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an RFID tag and an RFID privacy protection system and method transmitting a substantial RFID to an authenticated RFID reader using a pseudo ID to protect RFID tag information.

According to an aspect of exemplary embodiments of the present invention, there is provided a radio frequency identification (RFID) privacy protection method applied to an RFID privacy protection system including an RFID tag and an RFID reader, in which a pseudo identification (ID) used to authenticate the RFID reader and a key used to generate the pseudo ID is received; if the pseudo ID is received in response to an information request signal for reading information of the RFID tag comprising the pseudo ID, the key is transmitted; and if a pseudo ID generated using the key is equal to the pseudo ID received in response to the information request signal, an RFID of the RFID tag to read the information of the RFID tag is received.

In an exemplary implementation, the RFID privacy protection method may further include writing a common pseudo ID generated using a common key of the RFID privacy protection system to the RFID tag.

In another exemplary implementation, the common pseudo ID written in response to the information request signal for reading the information of the RFID tag may be received.

According to another aspect of exemplary embodiments of the present invention, there is provided an RFID tag of an RFID privacy protection system including the RFID tag and an RFID reader, in which a transceiver receives and transmits a pseudo ID and a key; a tag storage stores a pseudo ID used to authenticate the RFID reader; if a key corresponding to the pseudo ID transmitted in response to an information transmission request signal of the RFID reader is received, a determiner determines whether the stored pseudo ID is equal to a pseudo ID generated using the received key; and if the stored pseudo ID is equal to the generated pseudo ID, a tag controller transmits an RFID of the RFID tag through the transceiver.

In an exemplary implementation, the tag storage may store a common pseudo ID generated using a common key of the RFID privacy protection system.

According to still another aspect of exemplary embodiments of the present invention, there is provided an RFID privacy protection system comprising an RFID tag and an RFID reader, in which a transceiver receives and transmits a pseudo ID and a key; an RFID interface transmits an information request signal for reading information of the RFID tag; a storage stores a pseudo ID received through the transceiver to be used to authenticate the RFID reader and a key used to generate the pseudo ID; and if the pseudo ID is received in response to the information request signal, a controller transmits the key through the RFID interface and receives the RFID of the RFID tag.

In an exemplary implementation, if the pseudo ID is changed, the storage may store a common key used to generate the changed pseudo ID.

In another exemplary implementation, the controller may write a common pseudo ID generated using the common key of the RFID privacy protection system to the RFID tag.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
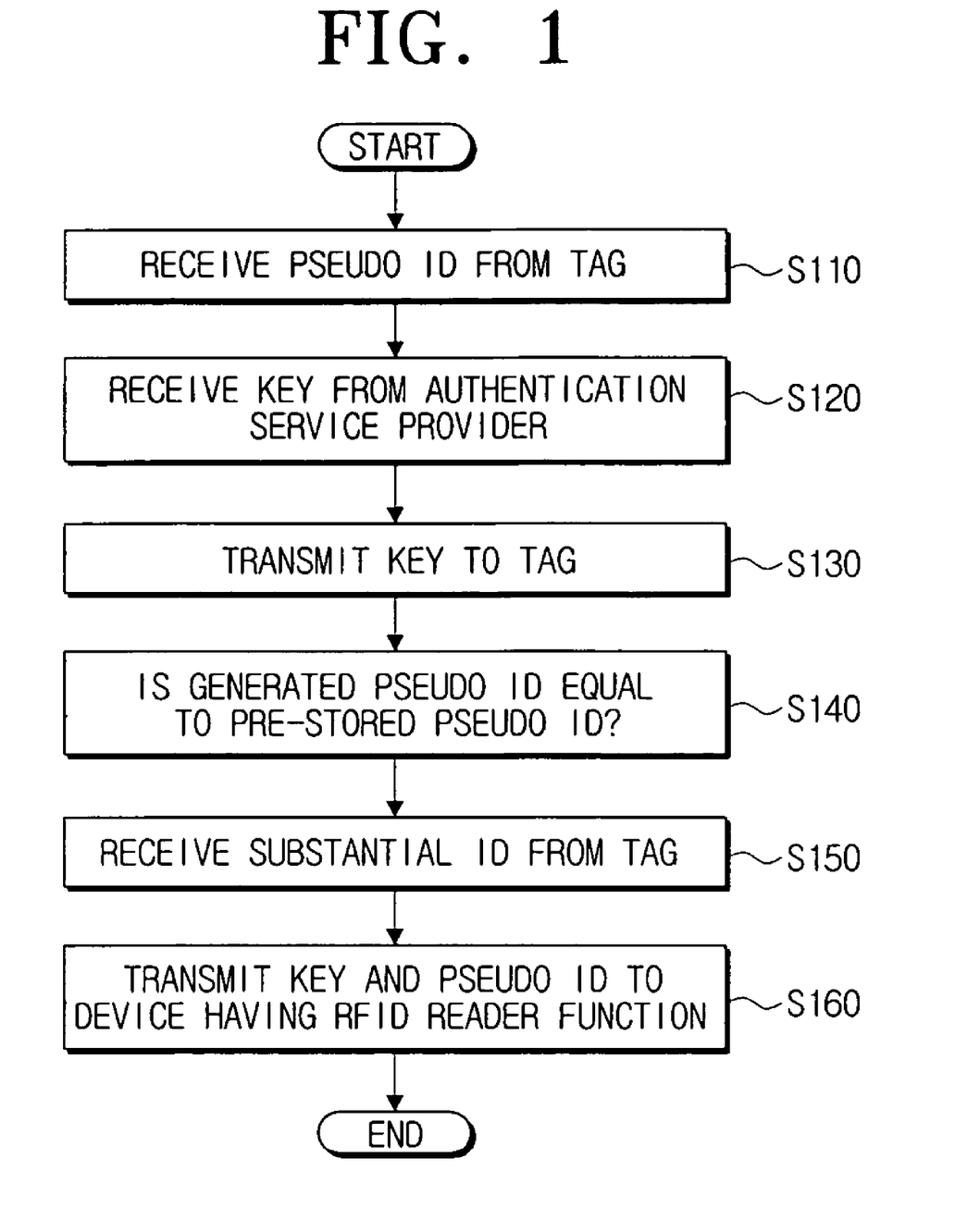
FIG. 1 is a flowchart of a method of receiving a pseudo ID and key used to read tag information in an RFID privacy protection method according to an exemplary embodiment of the present invention.

FIG. 1 is a flowchart of a method of receiving a pseudo ID and key used to read tag information in an RFID privacy protection method according to an exemplary embodiment of the present invention. Referring to FIG. 1, in operation S110, an RFID reader transmits an RFID request signal to an RFID tag and then receives a pseudo ID from the RFID tag. In an exemplary implementation, the pseudo ID is not a substantial RFID of the RFID tag, but an ID used to authenticate regardless if the RFID reader that transmitted the RFID request signal is able to read private information set in the RFID tag. The pseudo ID pre-stores an authentication service provider for authenticating the RFID tag and the RFID reader.

In operation S120, the RFID reader receives a key corresponding to the pseudo ID received from the RFID tag from the authentication service provider. If the RFID reader transmits the pseudo ID to the authentication service provider and the authentication service provider determines that the RFID reader is able to read information of the RFID tag, the authentication service provider transmits the key corresponding to the pseudo ID to the RFID reader. In an exemplary implementation, the authentication service provider is a trusted third provider (TTP) and manages pseudo IDs of tags and keys respectively corresponding to the pseudo IDs.

In operation S130, the RFID reader transmits the key received from the authentication service provider to the RFID tag. In operation S140, the RFID tag determines whether a generated pseudo ID is equal to a pre-stored pseudo ID using the key. The pseudo ID pre-stored in the RFID tag is generated by substituting a key value for a hash function. Thus, the RFID tag determines whether the pseudo ID generated by substituting the key received from the RFID reader for the hash function is equal to the pre-stored pseudo ID.

If the RFID tag determines in operation S140 that the generated pseudo ID is equal to the pre-stored pseudo ID, in operation S150, the RFID reader receives a substantial RFID from the RFID tag. If the generated pseudo ID is equal to the pre-stored pseudo ID, the RFID reader may determine that the RFID reader has received the key authenticated by the authentication service provider to be used to generate the pseudo ID.

Thus, the RFID tag may transmit the substantial RFID to the RFID reader being authenticated, and the RFID reader may read the information of the RFID tag using the substantial RFID.

In operation S160, the RFID reader transmits the key and the pseudo ID to a device including an RFID reader function.

In other words, the RFID reader transmits the key and the pseudo ID used to read the information of the RFID tag to the device including the RFID reader function so that the device reads the information of the RFID tag.

Therefore, various devices including RFID reader functions cannot request RFID transmission commands of the RFID tag to read the information of the RFID tag. However, a device that received the pseudo ID and the key from the RFID reader being authenticated and an RFID reader function may read the information of the RFID tag.

In the RFID privacy protection method described with reference to FIG. 1, when a buyer purchase an article including a tag with a pseudo ID, the buyer may receive the pseudo ID and key from an authenticated RFID reader in order to read information of the article. In an exemplary implementation, the RFID reader may be installed in a retail establishment where a buyer purchases the article. A device including an RFID reader function may be a device including an RFID reader function similarly as a mobile phone of the buyer.

Accordingly, when the buyer pays for the article including the tag, the RFID reader in the retail establishment transmits a pseudo ID received from the tag and key received from an authentication service provider to the device of the buyer including the RFID reader function.

The buyer may read the tag information of the article using the device including the RFID reader function. On the other hand, another device including an RFID reader function, which has not received the pseudo ID and the key from the RFID reader in the retail establishment cannot read the information of the article of the buyer.

Figure 2:
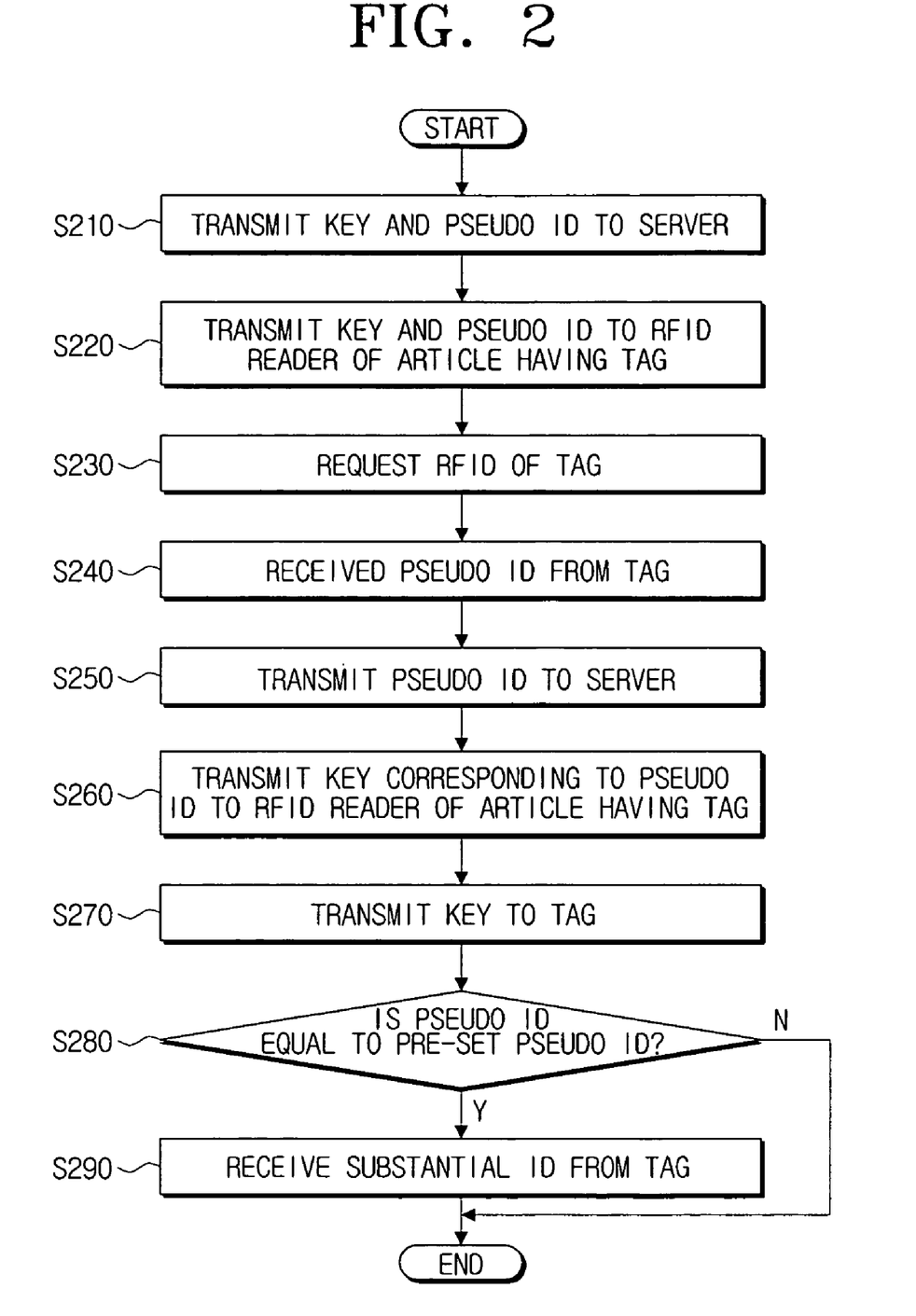
FIG. 2 is a flowchart of a method of reading RFID tag information using a pseudo ID and key in an RFID privacy protection method according to an exemplary embodiment of the present invention.

FIG. 2 is a flowchart of a method of reading RFID tag information using a pseudo ID and key in an RFID privacy protection method according to an exemplary embodiment of the present invention. Referring to FIG. 2, in operation S210, a device including an RFID reader function receives a pseudo ID and a key used to generate the pseudo ID from an RFID reader authenticated by an authentication service provider, and transmits the pseudo ID and the key to a server.

In operation S220, the server transmits the pseudo ID and the key to an RFID reader of an article including a tag. When the server reads information of the tag using the RFID reader of the article, the server transmits the pseudo ID and the key used to read the information of the tag to the RFID reader of the article.

An example of a device including an RFID reader function that reads tag information will be described below.

In operation S230, the device including the RFID reader function transmits a signal to request an RFID of the tag.

In operation S240, the RFID reader of the article including the tag receives the pseudo ID from the tag. In operation S250, the RFID reader transmits the pseudo ID to the server.

If the tag receives the signal for requesting the RFID, the tag transmits the pseudo ID, not a substantial RFID, to authenticate the RFID reader that transmitted the signal. The device including the RFID reader which received the pseudo ID transmits a key used to generate the pseudo ID.

In operation S260, the server transmits the key corresponding to the pseudo ID to the RFID reader of the article including the tag. In operation S270, the RFID reader of the article transmits the key to the tag.

In operation S280, the tag generates the pseudo ID using the key and determines whether the pseudo ID is equal to a pre-stored pseudo ID transmitted according to the signal for requesting the RFID.

If the generated pseudo ID is equal to the pre-stored pseudo ID, in operation S290, the tag transmits a substantial RFID to the device including the RFID reader function. If the generated pseudo ID is equal to a pseudo ID the tag transmitted according to an RFID request command, the RFID reader, which transmitted the signal for requesting the RFID, is an authenticated RFID reader and thus transmits an RFID used to read information of the tag.

Thus, the RFID reader, which received the substantial RFID, may obtain the information of the tag using the substantial RFID.

Figure 3:
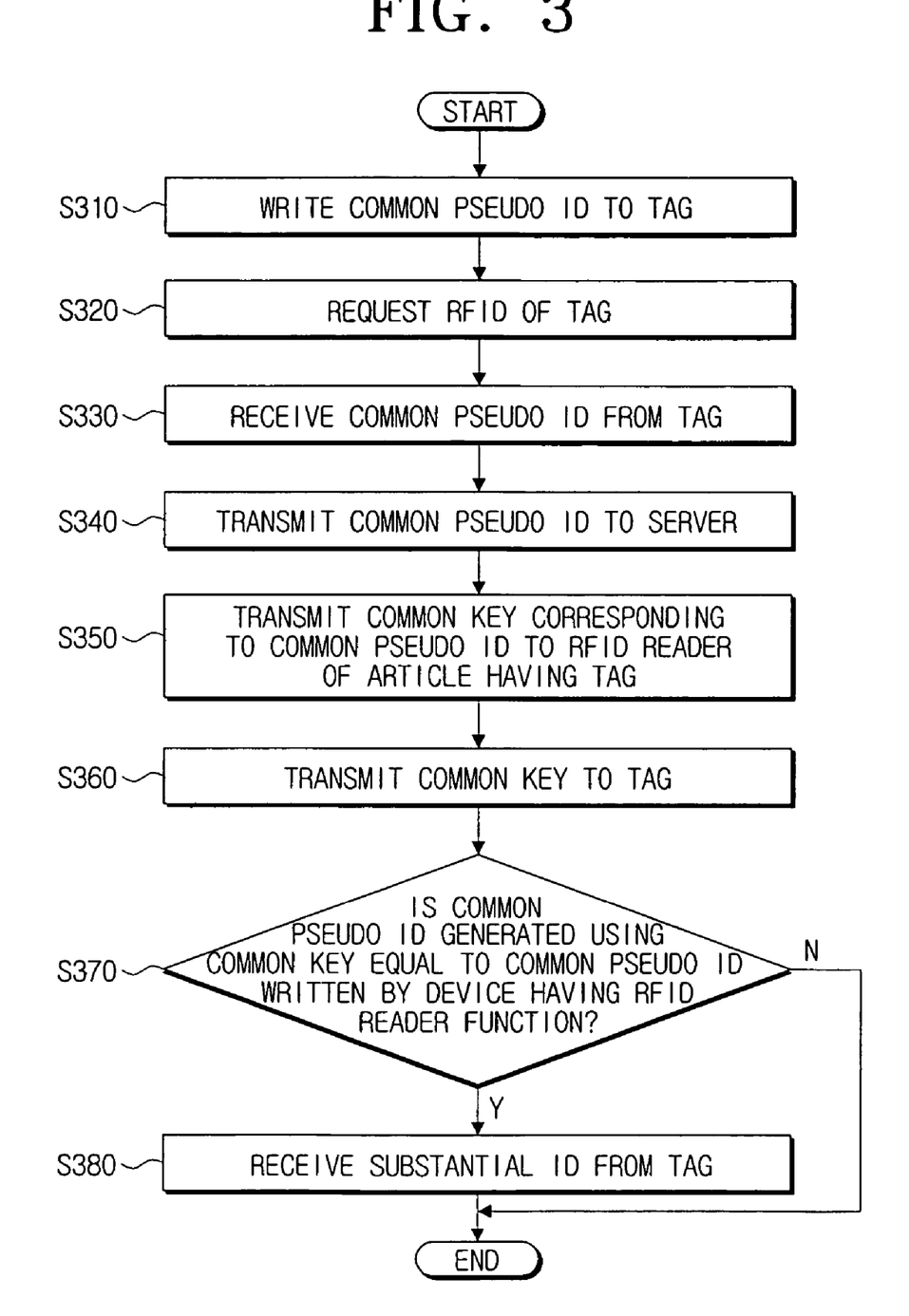
FIG. 3 is a flowchart of a method of reading RFID tag information using a pseudo ID and key in an RFID privacy protection method according to an exemplary embodiment of the present invention.

FIG. 3 is a flowchart of a method of reading RFID tag information using pseudo ID and key in an RFID privacy protection method according to an exemplary embodiment of the present invention.

Referring to FIG. 3, in operation S310, a device including an RFID reader function is authenticated by a tag using a received pseudo ID and key, and then writes a common pseudo ID that is a new pseudo ID to the tag. The common pseudo ID is a new pseudo ID generated using a common pre-stored pseudo ID in a device including an RFID reader function.

A device including an RFID reader function does not read information of each tag using each pseudo ID corresponding to each tag. However, the device writes a common pseudo ID as a new pseudo ID to each tag so that each tag has the same pseudo ID.

A method by which a tag authenticates a device including an RFID reader function using a common pseudo ID is similar to the method by which the tag authenticates the device including the RFID reader function using the pseudo ID as described with reference to FIG. 2.

In operation S320, the device including the RFID reader function transmits an RFID request signal to read each tag information. In operation S330, the device receives the common pseudo ID from the tag. If the tag receives the RFID request signal from the device including the RFID reader function, the tag transmits the common pseudo ID, not a substantial RFID, to the device in order to authenticate the device.

In operation S340, the device transmits the common pseudo ID to a server. In operation S350, the server transmits a common key corresponding to the common pseudo ID to an RFID reader of an article including the tag. In operation S360, the RFID reader of the article transmits the common key to the tag.

In operation S370, the tag determines whether a common pseudo ID generated using the common key is equal to the common pseudo ID written by the device including the RFID reader function.

If the generated common pseudo ID is equal to the written common pseudo ID, in operation S380, the device including the RFID reader function receives the substantial RFID from the tag.

Thus, the device including the RFID reader function may obtain information of the tag using the substantial RFID.

As a result, the tag may transmit the information of the tag to the device including the RFID reader function and being authenticated using the common pseudo ID.

The device including the RFID reader function may write the common pseudo ID generated using the common key to each tag which authenticated the device to read the information of the tag in order to read information of tags including different pseudo IDs using the common pseudo ID.

Tag information may be read using a device including an RFID reader function and an RFID reader of an article including a tag. The device including the RFID reader function may transmit a common key and a common pseudo ID to a server connected to an article through a network. The server may transmit the common key and the common pseudo ID to an RFID reader of the article. Thus, the RFID reader of the article may be authenticated by the tag using the common key and the common pseudo ID, and then reads tag information.

Figure 4:
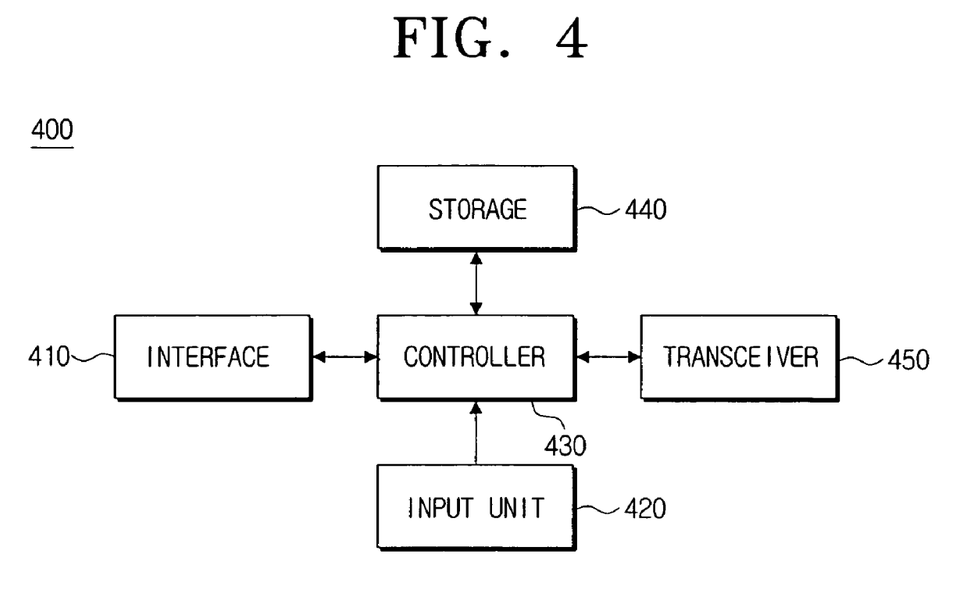
FIG. 4 is a block diagram of an RFID privacy protection system according to an exemplary embodiment of the present invention.

FIG. 4 is a block diagram of an RFID privacy protection system according to an exemplary embodiment of the present invention. Referring to FIG. 4, the RFID privacy protection system includes an interface 410, input unit 420, controller 430, storage 440, and transceiver 450.

The interface 410 receives a signal from an RFID tag under the control of the controller 430 or transmits a tag information request signal.

The input unit 420 receives a predetermined command, such as an RFID tag information reading command from a user and transmits the predetermined command to the controller 430.

The transceiver 450 receives a pseudo ID and key used to read tag information under the control of the controller 430, and transmits the pseudo ID and the key to the controller 430.

The storage 440 stores the pseudo ID and the key, and a common key used for a common pseudo ID. In an exemplary implementation, the common pseudo ID is a pseudo ID used to manage one of different pseudo IDs of tags.

If a reading command is input through the input unit 420, the controller 430 controls the interface 410 to transmit a tag information transmission request signal. The controller 430 controls the storage 440 to store the pseudo ID and the key received through the transceiver 450, and controls an RFID reader of an article including a tag to transmit the pseudo ID and the key through the transceiver 450 in order to read tag data using the RFID reader of the article.

The controller 430 also generates the common pseudo ID using the common key and writes the common pseudo ID to the tag. If the common pseudo ID is written to the tag, the controller 430 transmits the common key and the common pseudo ID to the RFID reader of the article, and controls the tag to transmit the common key corresponding to the common pseudo ID.

Figure 5:
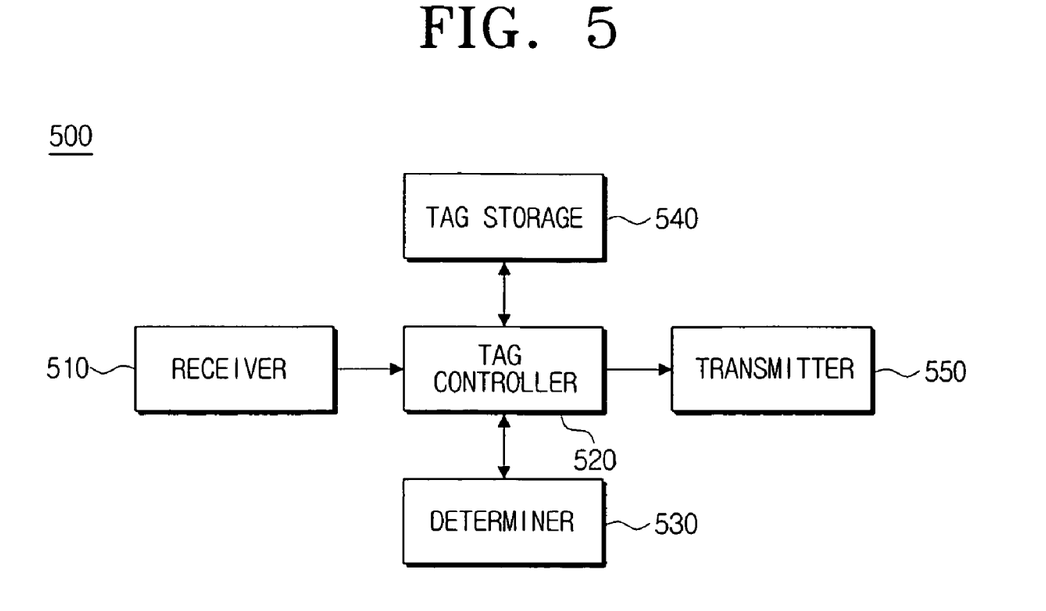
FIG. 5 is a block diagram of an RFID tag according to an exemplary embodiment of the present invention.

FIG. 5 is a block diagram of an RFID tag according to an exemplary embodiment of the present invention. Referring to FIG. 5, the RFID tag includes a receiver 510, tag controller 520, determiner 530, tag storage 540, and transmitter 550.

The receiver 510 transmits a tag information reading request signal and a key transmitted from an external RFID reader or a device including an RFID reader function to the tag controller 520.

The tag storage 540 stores a pseudo ID of a tag, a substantial RFID of the tag, a hash function used for generating the pseudo ID, a key used for generating the pseudo ID, and the like. If the device including the RFID reader function transmits a common pseudo ID of a plurality of tags to the tag, the tag storage 540 may store the common pseudo ID.

When the tag controller 520 receives the common pseudo ID through the receiver 510, the tag controller 520 controls the tag storage 540 to store the common pseudo ID. When the tag information reading request signal is input through the receiver 510, the tag controller 520 transmits the pseudo ID or the common pseudo ID stored in the tag storage 540 to the transmitter 550.

When the device includes the RFID reader, which transmitted the tag information reading request signal function that transmits the key, the determiner 530 generates the pseudo ID using the key and determines whether the generated pseudo ID is equal to the pseudo ID stored in the tag storage 540.

In an exemplary implementation, when the transmitted key is a common key, the determiner 530 determines whether a common pseudo ID generated using the common key is equal to the common pseudo ID stored in the tag storage 540. On the other hand, if the generated pseudo ID or the generated common pseudo ID is equal to the pseudo ID or the common pseudo ID stored in the tag storage 540, the determiner 530 authenticates the device including the RFID reader function, which transmitted the tag information reading request signal.

The transmitter 550 receives the pseudo ID or the common pseudo ID from the tag controller 520 and then transmits the pseudo ID or the common pseudo ID to the device including the RFID reader function, which transmitted the tag information reading request signal. When the determiner 530 authenticates the device, the transmitter 550 transmits tag information to the authenticate device.

Figure 6:
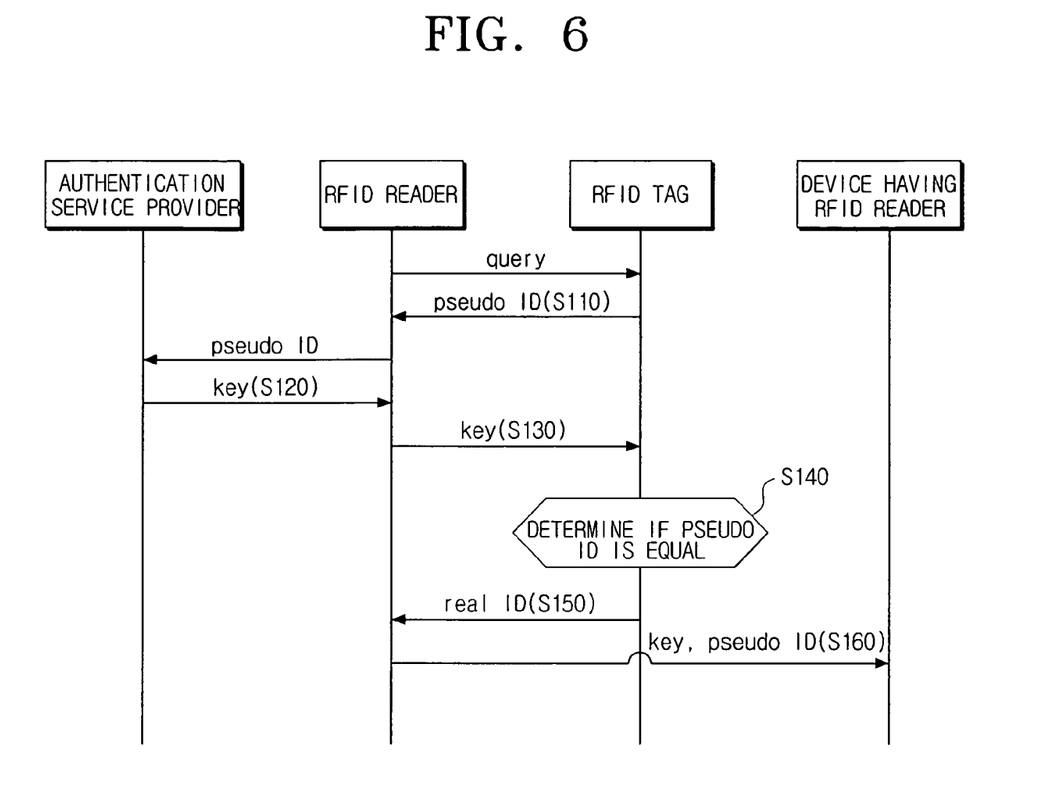
FIG. 6 is a signal flowchart of the method of receiving the pseudo ID and key shown in FIG. 1.

FIG. 6 is a signal flowchart illustrating the method of receiving the pseudo ID and the key used to read the tag information as shown in FIG. 1.

Referring to FIG. 6, the RFID reader authenticated by the authentication service provider transmits the RFID transmission request signal to the RFID tag to receive a substantial RFID of the RFID tag.

In operation S110, the RFID tag transmits the pseudo ID, not the substantial RFID, to the RFID reader in response to the RFID transmission request signal.

In operation S120, the RFID reader transmits the pseudo ID received from the RFID tag to the authentication service provider, and the authentication service provider authenticates the RFID reader which transmitted the pseudo ID in order to transmit the key corresponding to the pseudo ID to the RFID reader.

In operation S130, the RFID reader transmits the key received from the authentication service provider to the RFID tag. In operation S140, the RFID tag determines whether the pseudo ID generated using the key is equal to the pseudo ID transmitted in response to the RFID transmission request signal.

The RFID tag pre-stores a pseudo ID generated using the same key as the key of the authentication service provider. Thus, when the RFID tag receives the key from the RFID reader authenticated by the authentication service provider, the pseudo ID generated by the RFID tag using the key transmitted from the RFID reader is equal to the pre-stored pseudo ID. Thus, the RFID tag may authenticate the RFID reader.

If the generated pseudo ID is equal to the pseudo ID transmitted in response to the RFID transmission request signal, in operation S150, the RFID tag transmits the substantial RFID to the RFID reader.

In operation S160, the RFID reader transmits the key received from the authentication service provider and the pseudo ID received from the RFID tag to the device including the RFID reader similar to the mobile phone. Thus, the device including the RFID reader function can read the private information, or the like, of the RFID tag using the key and the pseudo ID received from the authenticated RFID reader.

Figure 7:
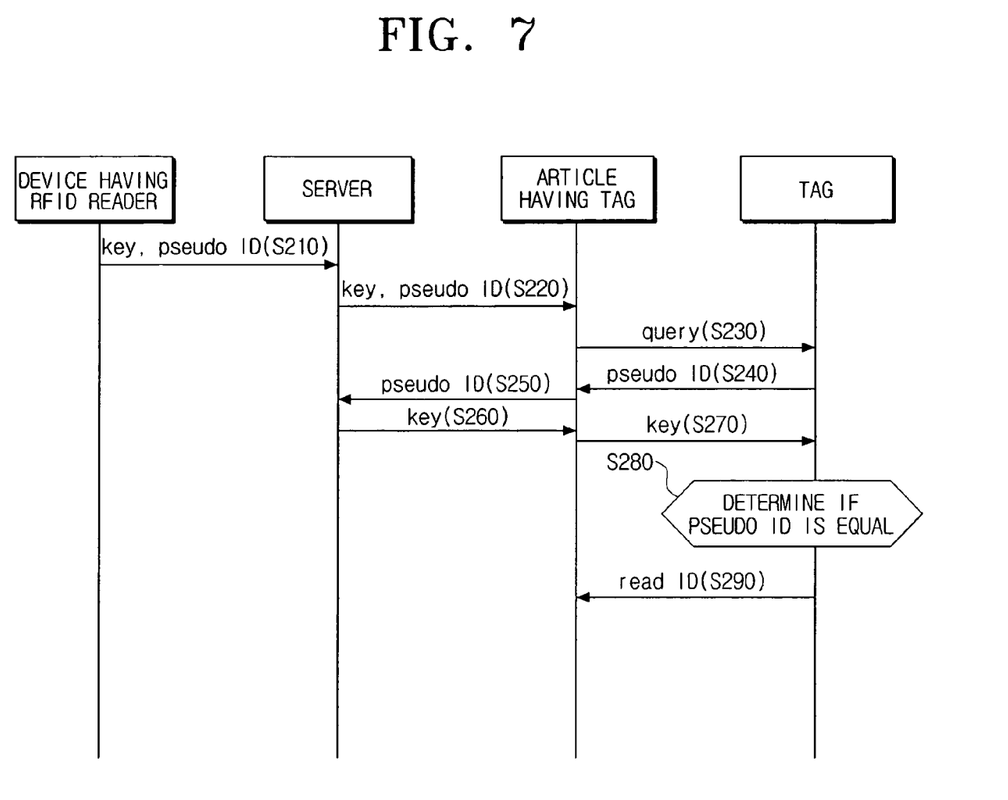
FIG. 7 is a signal flowchart of the method of reading the RFID tag information using the pseudo ID and key shown in FIG. 2.

FIG. 7 is a signal flowchart of the method of reading the RFID tag information using the pseudo ID and the key shown in FIG. 2. Referring to FIG. 7, in operation S210, the device including the RFID reader function receives the pseudo ID and the key from the RFID reader authenticated by the authentication service provider. The RFID reader transmits the pseudo ID and the key to the server communicating with the article including the RFID tag.

In operation S220, the server receives and stores the pseudo ID of each tag and the key corresponding to the pseudo ID, and transmits the pseudo ID and the key to the RFID reader of the article including the RFID tag.

In operation S230, the RFID reader of the article transmits the RFID request signal to the RFID tag to read the tag information storing information of the article.

In operation S240, the RFID tag transmits the pseudo ID to the RFID reader of the article including the RFID tag in response to the RFID request signal using the method by which the RFID tag authenticates the RFID reader as described with reference to FIG. 6.

In operation 250, the RFID reader of the article transmits the pseudo ID received from the RFID tag to the server. In operation S260, the server transmits the key corresponding to the pseudo ID to the RFID reader of the article.

In operation S270, the RFID reader of the article transmits the key used to generate the pseudo ID. In operation S280, the RFID tag compares the pseudo ID transmitted in response to the RFID request signal with the pseudo ID generated, using the transmitted key to authenticate the RFID reader of the article.

If the pseudo ID transmitted in response to the RFID request signal is equal to the pseudo ID generated using the transmitted key, in operation S290, the RFID tag transmits the substantial RFID to the RFID reader of the article. The RFID reader of the article can obtain the information of the RFID tag using the substantial RFID.

The exemplary embodiments of the present invention may be applied when a server communicating with an article including a tag is a home server, a device including an RFID reader function is a mobile phone, and the article including the tag is an electronic product. In this instance, a buyer who paid for the electronic product may receive a pseudo ID and a key of a tag of the electronic product capable of reading information of the electronic product purchased through the mobile phone, and read the information of the electronic product using the mobile phone or an RFID reader of the electronic product.

Figure 8:
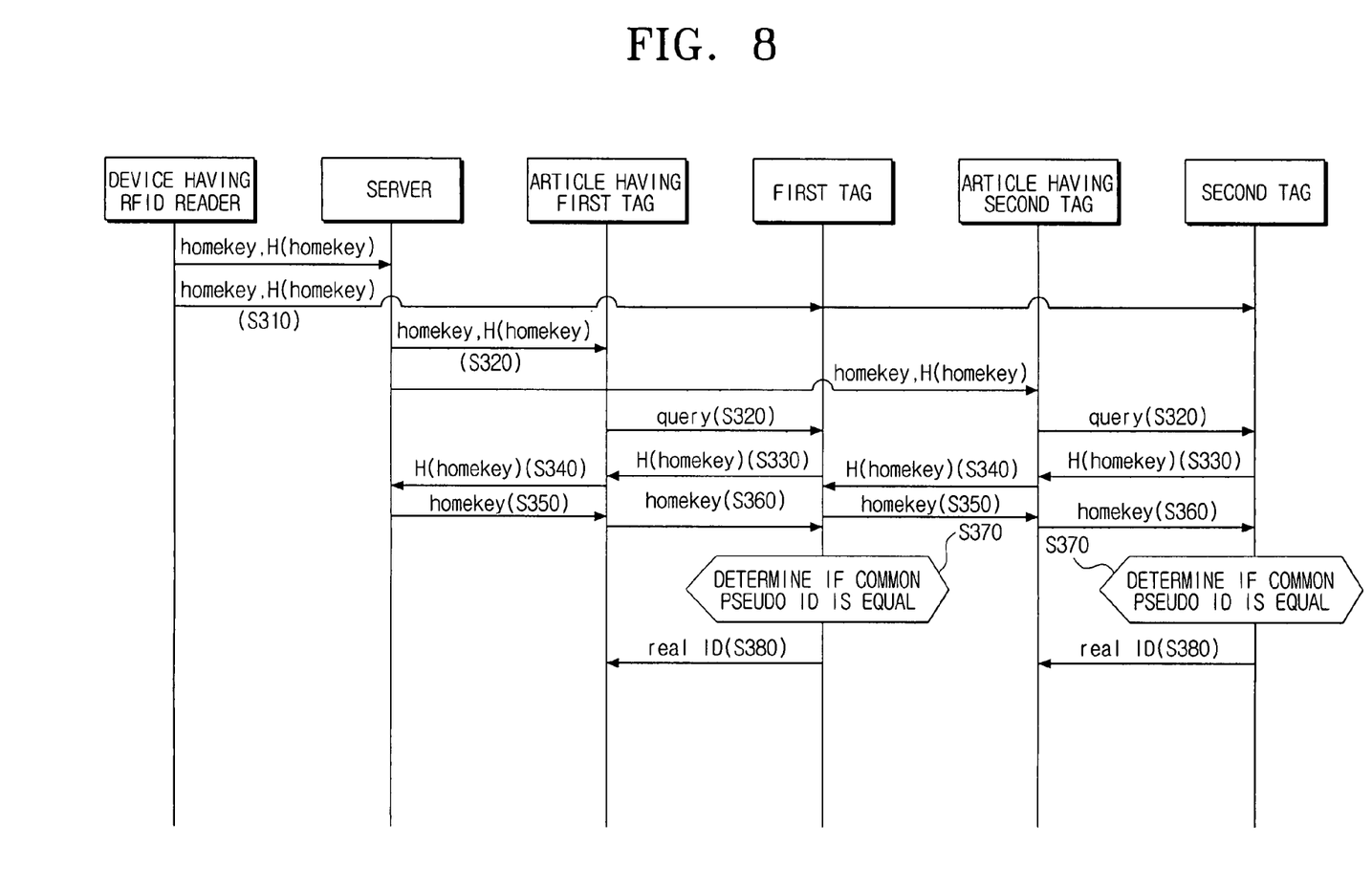
FIG. 8 is a signal flowchart of the method of reading the RFID tag information using the pseudo ID and key shown in FIG. 3.

FIG. 8 is a signal flowchart of the method of reading the RFID tag information using the pseudo ID and the key shown in FIG. 3.

Differently from the method described with reference to FIG. 7, in the method of FIG. 8, the tag information is read using the common pseudo ID, and not the pseudo ID. The device including the RFID reader function reads the tag information using the common pseudo ID generated using the common key, and not the pseudo ID, received from the authenticated RFID reader. The device including the RFID reader function writes the generated common pseudo ID to each tag. Then, the device is authenticated by each tag using the method described with reference to FIG. 7. Also, the device may receive the substantial RFID from each tag to read the tag information.

Referring to FIG. 8, in operation S310, a home key that is a common key and a pseudo ID H generated by applying a hash function to the home key are written to first and second tags. Operations S320 through S380 are similar to those of the method described with reference to FIG. 7.

As described above, according to exemplary embodiments of the present invention, a substantial RFID may be transmitted to an authenticated RFID reader using a pseudo ID. Thus, the authenticated RFID reader may read tag information. As a result, private information of a tag may be protected.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A radio frequency identification (RFID) privacy protection method applied to an RFID privacy protection system comprising an RFID tag including a pseudo identification (ID) and a RFID that is different from the pseudo ID, and an RFID reader, the method comprising:
   receiving, by the RFID reader, the pseudo ID, from the RFID tag;
   transmitting, by the RFID reader, the pseudo ID received from the RFID tag to an authentication service provider;
   receiving, by the RFID reader, a key used to generate a pseudo ID from the authentication service provider;
   if the pseudo ID is received in response to an information request signal for reading information of the RFID tag comprising the pseudo ID, transmitting, by the RFID reader, the key to the RFID tag; and
   if a pseudo ID generated using the key is equal to the pseudo ID received in response to the information request signal, receiving, by the RFID reader, the RFID of the RFID tag to read the information of the RFID tag,
   wherein the pseudo ID is not a substantial RFID of the RFID tag, but an ID used to authenticate regardless if the RFID reader that transmitted the RFID request signal is able to read private information set in the RFID tag, and the RFID is provided after the authentication.

2. The RFID privacy protection method of claim 1, further comprising writing a common pseudo ID generated using a common key of the RFID privacy protection system to the RFID tag.

3. The RFID privacy protection method of claim 2, wherein the common pseudo ID written in response to the information request signal for reading the information of the RFID tag is received.

4. A radio frequency identification (RFID) tag of an RFID privacy protection system comprising a RFID tag and an RFID reader, the RFID tag comprising:
   a pseudo identification (ID);
   a RFID that is different from the pseudo ID;
   a transceiver for receiving and transmitting the pseudo ID and a key;
   a tag storage for storing the pseudo ID used to authenticate the RFID reader;
   a determiner for determining whether the stored pseudo ID is equal to a pseudo ID generated using the received key, if a key corresponding to the pseudo ID transmitted in response to an information transmission request signal of the RFID reader is received; and
   a tag controller for transmitting the RFID of the RFID tag through the transceiver, if the stored pseudo ID is equal to the generated pseudo ID,
   wherein the pseudo ID is not a substantial RFID of the RFID tag, but an ID used to authenticate regardless if the RFID reader that transmitted the RFID request signal is able to read private information set in the RFID tag, and the RFID is provided after the authentication.

5. The RFID tag of claim 4, wherein the tag storage stores a common pseudo ID generated using a common key of the RFID privacy protection system.

6. A radio frequency identification (RFID) privacy protection system comprising an RFID tag including a pseudo identification (ID) and a RFID that is different from the pseudo ID, an RFID reader, and a device including an RFID reader function, the device including an RFID reader function comprising:
   a transceiver for receiving and transmitting the pseudo ID and a key;
   an RFID interface for transmitting an information request signal for reading information of the RFID tag;
   a storage for storing the pseudo ID and a key used to generate the pseudo ID received through the transceiver from the authenticated RFID reader; and
   a controller for transmitting the key to the RFID tag through the RFID interface if the pseudo ID is received in response to the information request signal, and receiving the RFID of the RFID tag,
   wherein the pseudo ID is not a substantial RFID of the RFID tag, but an ID used to authenticate regardless if the RFID reader that transmitted the RFID request signal is able to react private information set in the RFID tag, and the RFID is provided after the authentication.

7. The device including an RFID reader function of claim 6, wherein if the pseudo ID is changed, the storage stores a common key used to generate a pseudo ID is changed.

8. The device including an RFID reader function of claim 7, wherein the controller writes a common pseudo ID generated using the common key to the RFID tag.

* * * * *